US011030093B2

(12) United States Patent
Chou et al.

(10) Patent No.: US 11,030,093 B2
(45) Date of Patent: Jun. 8, 2021

(54) HIGH EFFICIENCY GARBAGE COLLECTION METHOD, ASSOCIATED DATA STORAGE DEVICE AND CONTROLLER THEREOF

(71) Applicant: Silicon Motion Inc., Hsinchu County (TW)

(72) Inventors: Ting-Heng Chou, Taipei (TW); Jian-Wei Sun, Taipei (TW)

(73) Assignee: Silicon Motion, Inc., Hsinchu County (TW)

( * ) Notice: Subject to any disclaimer, the term of this patent is extended or adjusted under 35 U.S.C. 154(b) by 114 days.

(21) Appl. No.: 16/445,136

(22) Filed: Jun. 18, 2019

(65) Prior Publication Data

US 2020/0089608 A1 Mar. 19, 2020

Related U.S. Application Data

(60) Provisional application No. 62/731,993, filed on Sep. 17, 2018.

(30) Foreign Application Priority Data

Jan. 18, 2019 (TW) ................................ 108102004

(51) Int. Cl.
*G06F 12/00* (2006.01)
*G06F 12/02* (2006.01)
*G06F 12/1009* (2016.01)

(52) U.S. Cl.
CPC ...... *G06F 12/0253* (2013.01); *G06F 12/1009* (2013.01); *G06F 2212/7201* (2013.01); *G06F 2212/7205* (2013.01)

(58) Field of Classification Search
CPC ............ G06F 12/0253; G06F 12/1009; G06F 2212/7201; G06F 2212/7205
See application file for complete search history.

(56) References Cited

U.S. PATENT DOCUMENTS

| 6,141,728 A | 10/2000 | Simionescu |
| 7,436,858 B2 | 10/2008 | Goren |

(Continued)

FOREIGN PATENT DOCUMENTS

| CN | 108073522 A | 5/2018 |
| CN | 108475232 A | 8/2018 |

(Continued)

*Primary Examiner* — Prasith Thammavong
(74) *Attorney, Agent, or Firm* — Winston Hsu

(57) ABSTRACT

A high efficiency garbage collection method, an associated data storage device and a controller thereof are provided. The high efficiency garbage collection method includes: starting and executing a garbage collection procedure; determining whether a Trim command from a host device is received; in response to the Trim command being received, determining whether target data of the Trim command is stored in a source block of the garbage collection procedure; in response to the target data being stored in the source block, determining whether the target data stored in the source block has been copied to a destination block of the garbage collection procedure; and in response to the target data stored in the source block having been copied to the destination block, changing at least one physical address of the target data of the Trim command to a Trim tag in a logical-to-physical address mapping table.

17 Claims, 7 Drawing Sheets

(56) References Cited

U.S. PATENT DOCUMENTS

| | | |
|---|---|---|
| 7,587,558 B1 | 9/2009 | Smith |
| 8,949,512 B2 | 2/2015 | Vogan |
| 9,448,919 B1* | 9/2016 | Boyle .................. G06F 3/0652 |
| 9,703,699 B2 | 7/2017 | Ehrlich |
| 10,025,534 B1 | 7/2018 | Naing |
| 2002/0161984 A1* | 10/2002 | Lloyd-Jones ....... G06F 12/0238 |
| | | 711/203 |
| 2004/0226021 A1 | 11/2004 | Miki |
| 2006/0212674 A1* | 9/2006 | Chung ................ G06F 12/0246 |
| | | 711/202 |
| 2007/0070690 A1* | 3/2007 | Scheuerlein .......... H01L 27/101 |
| | | 365/171 |
| 2008/0025069 A1* | 1/2008 | Scheuerlein ........... G11C 17/16 |
| | | 365/148 |
| 2008/0025118 A1* | 1/2008 | Scheuerlein ........... G11C 11/56 |
| | | 365/201 |
| 2008/0104361 A1* | 5/2008 | Ippongi ............... G06F 12/0246 |
| | | 711/206 |
| 2011/0145306 A1 | 6/2011 | Boyd |
| 2012/0173832 A1* | 7/2012 | Post .................... G06F 12/0246 |
| | | 711/165 |
| 2013/0173931 A1 | 7/2013 | Tzafrir |
| 2013/0275660 A1 | 10/2013 | Bennett |
| 2014/0164857 A1 | 6/2014 | Finch |
| 2014/0304487 A1* | 10/2014 | Hayasaka ............. G06F 3/0604 |
| | | 711/202 |
| 2016/0034186 A1 | 2/2016 | Weiner |
| 2016/0092352 A1* | 3/2016 | Camp .................... G06F 3/064 |
| | | 711/103 |
| 2016/0299715 A1* | 10/2016 | Hashimoto ......... G06F 12/0246 |
| 2017/0177469 A1* | 6/2017 | Hashimoto ........... G06F 3/0604 |
| 2017/0293553 A1* | 10/2017 | Heller ................ G06F 12/0246 |
| 2018/0210653 A1 | 7/2018 | Parthasarathy |
| 2018/0210832 A1* | 7/2018 | Tang ................... G06F 12/0292 |

FOREIGN PATENT DOCUMENTS

| | | |
|---|---|---|
| TW | I430090 B | 3/2014 |
| TW | 201527973 A | 7/2015 |
| TW | 201740265 A | 11/2017 |
| TW | I619017 B | 3/2018 |
| TW | 201833777 A | 9/2018 |
| TW | I634424 B | 9/2018 |

* cited by examiner

| | L2P grouping table #0 |
|---|---|
| LBA#0 | BLK#0,Page#0 |
| LBA#1 | BLK#0,Page#1 |
| LBA#2 | BLK#0,Page#2 |
| ... | ... |
| LBA#100 | BLK#1,Page#0 |
| LBA#101 | BLK#2,Page#0 |
| LBA#102 | BLK#2,Page#1 |
| ... | ... |
| LBA#1022 | BLK#2,Page#2 |
| LBA#1023 | BLK#1,Page#511 |

| | L2P grouping table #1023 |
|---|---|
| LBA#1047553 | FFFF-FFFF |
| LBA#1047554 | FFFF-FFFF |
| LBA#1047555 | FFFF-FFFF |
| ... | ... |
| LBA#1048000 | BLK#1,Page#1 |
| LBA#1048001 | BLK#1,Page#2 |
| LBA#1048002 | BLK#1,Page#3 |
| ... | ... |
| LBA#1048570 | BLK#2,Page#3 |
| LBA#1048571 | BLK#2,Page#4 |

FIG. 2

| | L2P grouping table #0 |
|---|---|
| LBA#0 | BLK#0,Page#0 |
| LBA#1 | BLK#0,Page#1 |
| LBA#2 | BLK#0,Page#2 |
| ... | ... |
| LBA#100 | FFFF-FFFE |
| LBA#101 | BLK#2,Page#0 |
| LBA#102 | BLK#2,Page#1 |
| ... | ... |
| LBA#1022 | BLK#2,Page#2 |
| LBA#1023 | BLK#1,Page#511 |

| | L2P grouping table #1023 |
|---|---|
| LBA#1047553 | FFFF-FFFF |
| LBA#1047554 | FFFF-FFFF |
| LBA#1047555 | FFFF-FFFF |
| ... | ... |
| LBA#1048000 | BLK#1,Page#1 |
| LBA#1048001 | BLK#1,Page#2 |
| LBA#1048002 | BLK#1,Page#3 |
| ... | ... |
| LBA#1048570 | BLK#2,Page#3 |
| LBA#1048571 | BLK#2,Page#4 |

FIG. 4

L2P table

| | |
|---|---|
| Page#0 | ⋮ |
| Page#1 | ⋮ |
| Page#2 | ⋮ |
| ⋮ | ⋮ |
| Page#400 | LBA#100 |
| Page#401 | LBA#1048000 |
| Page#402 | LBA#1048001 |
| Page#403 | LBA#1048002 |
| Page#404 | LBA#1023 |
| ⋮ | ⋮ |
| Page#511 | ⋮ |

FIG. 5

| L2P grouping table #0 | |
|---|---|
| LBA#0 | BLK#0,Page#0 |
| LBA#1 | BLK#0,Page#1 |
| LBA#2 | BLK#0,Page#2 |
| ... | ... |
| LBA#100 | FFFF-FFFF |
| LBA#101 | BLK#2,Page#0 |
| LBA#102 | BLK#2,Page#1 |
| ... | ... |
| LBA#1022 | BLK#2,Page#2 |
| LBA#1023 | BLK#12,Page#4 |

| L2P grouping table #1023 | |
|---|---|
| LBA#1047553 | FFFF-FFFF |
| LBA#1047554 | FFFF-FFFF |
| LBA#1047555 | FFFF-FFFF |
| ... | ... |
| LBA#1048000 | BLK#12,Page#1 |
| LBA#1048001 | BLK#12,Page#2 |
| LBA#1048002 | BLK#12,Page#3 |
| ... | ... |
| LBA#1048570 | BLK#2,Page#3 |
| LBA#1048571 | BLK#2,Page#4 |

FIG. 6

L2P table

| | |
|---|---|
| Page#0 | ⋮ |
| Page#1 | ⋮ |
| Page#2 | ⋮ |
| ⋮ | ⋮ |
| Page#400 | FFFF-FFFF |
| Page#401 | LBA#1048000 |
| Page#402 | LBA#1048001 |
| Page#403 | LBA#1048002 |
| Page#404 | LBA#1023 |
| ⋮ | ⋮ |
| Page#511 | ⋮ |

FIG. 7

HIGH EFFICIENCY GARBAGE COLLECTION METHOD, ASSOCIATED DATA STORAGE DEVICE AND CONTROLLER THEREOF

CROSS REFERENCE TO RELATED APPLICATIONS

This application claims the benefit of U.S. Provisional Application No. 62/731,993, which was filed on Sep. 17, 2018, and is included herein by reference.

BACKGROUND OF THE INVENTION

1. Field of the Invention

The present invention is related to Flash memory access, and more particularly, to a high efficiency garbage collection method, an associated data storage device, and a controller thereof.

2. Description of the Prior Art

Developments in flash memory technology have led to the wide application of portable or non-portable data storage devices. Examples include memory cards conforming to SD/MMC, CF, MS, XD or UFS specifications, solid-state drives, and embedded storage devices conforming to UFS or EMMC specifications. NAND flash memories may comprise single level cell (SLC) and multiple level cell (MLC) flash memories. New data storage device products may utilize triple level cell (TLC) flash memories, or even quadruple level cell (QLC) flash memories. To ensure that access control of a flash memory in a data storage device meets related specifications, a controller of the flash memory is usually configured to have management mechanisms to properly manage internal operations thereof.

According to flash memory features, a data storage device may support Trim commands, which comprise information such as starting logical addresses and numbers which indicate target data to be invalidated. The data storage device then invalidates the target data according to the Trim command. Executing the Trim command takes a lot of time, however. Further, if the target data to be trimmed by the Trim command has been copied to a destination block of a garbage collection procedure, data management will become complicated. Under a specific condition, the data storage device cannot finish the Trim command in time, thereby causing a command timeout event. In order to avoid the command timeout event, the data storage device might be forced to immediately execute a series of related operations, which may degrade overall performance of the data storage device. Thus, there is a need for a novel method and related architecture that can implement a data storage device having optimal performance without introducing any side effect or in a way that is less likely to introduce side effects.

SUMMARY OF THE INVENTION

One of the objectives of the present invention is to provide a high efficiency garbage collection method, an associated data storage device, and a controller thereof, to solve the aforementioned problems.

Another objective of the present invention is to provide a high efficiency garbage collection method, an associated data storage device, and a controller thereof, to achieve optimal performance without introducing any side effect or in a way that is less likely to introduce side effects.

At least one embodiment of the present invention provides a high efficiency garbage collection method, wherein the method is applicable to a data storage device, the data storage device comprises a non-volatile (NV) memory, and the NV memory comprises at least one NV memory element. The method may comprise: starting and executing a garbage collection procedure; determining whether a Trim command from a host device is received; in response to the Trim command being received, determining whether target data of the Trim command is stored in a source block of the garbage collection procedure; in response to the target data being stored in the source block, determining whether the target data stored in the source block has been copied to a destination block of the garbage collection procedure; and in response to the target data stored in the source block having been copied to the destination block, changing at least one physical address of the target data of the Trim command to a Trim tag in a logical-to-physical (L2P) address mapping table (which may be referred to as L2P table for brevity), wherein the Trim tag indicates invalidation of the target data.

At least one embodiment of the present invention provides a data storage device, which may comprise: an NV memory, configured to store information, wherein the NV memory comprises at least one NV memory element; and a controller, coupled to the NV memory, configured to control operations of the data storage device. The controller may comprise a processing circuit, and the processing circuit may control the controller according to a plurality of host commands from a host device, to allow the host device to access the NV memory through the controller. For example: the controller starts and executes a garbage collection procedure; the controller determines whether a Trim command from the host device is received; in response to the Trim command being received, the controller determines whether target data of the Trim command is stored in a source block of the garbage collection procedure; in response to the target data being stored in the source block, the controller determines whether the target data stored in the source block has been copied to a destination block of the garbage collection procedure; and in response to the target data stored in the source block having been copied to the destination block, the controller changes at least one physical address of the target data of the Trim command to a Trim tag in an L2P address mapping table, wherein the Trim tag indicates invalidation of the target data.

At least one embodiment of the present invention provides a controller of a data storage device, wherein the data storage device comprises the controller and an NV memory, and the NV memory comprises at least one NV memory element. The controller may comprise a processing circuit, and the processing circuit may control the controller according to a plurality of host commands from a host device, to allow the host device to access the NV memory through the controller. For example: the controller starts and executes a garbage collection procedure; the controller determines whether a Trim command from the host device is received; in response to the Trim command being received, the controller determines whether target data of the Trim command is stored in a source block of the garbage collection procedure; in response to the target data being stored in the source block, the controller determines whether the target data stored in the source block has been copied to a destination block of the garbage collection procedure; and in response to the target data stored in the source block having been copied to the destination block, the controller changes at least one physical address of the target data of the Trim command to a Trim tag in an L2P table, wherein the Trim tag indicates invalidation of the target data.

The present invention can properly control operations of the controller through inserting one or more Trim tags in at least one management table. More particularly, the present invention can smoothly execute various management mechanisms (such as the garbage collection mechanism and the Trim mechanism) under a condition of using the same hardware architecture, and can ensure that the data storage device can finish an access operation within a maximum allowable period (e.g. 8 seconds) defined in a certain specification without any latency. In addition, implementing the embodiments of the present invention will not greatly increase additional costs. Thus, problems in the related art can be solved, without significantly increasing overall costs. In comparison with the related art, the data storage device of the present invention can achieve optimal performance without introducing any side effect or in a way that is less likely to introduce side effects.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 illustrates an L2P table according to an embodiment of the present invention.

FIG. 4 illustrates an updated version of the L2P table shown in FIG. 2, where the updated version comprises a Trim tag.

FIG. 5 illustrates a physical-to-logical (P2L) address mapping table (referred to as P2L table for brevity) according to an embodiment of the present invention.

FIG. 6 illustrates another updated version of the L2P table shown in FIG. 2.

FIG. 7 illustrates an updated version of the P2L table shown in FIG. 5.

DETAILED DESCRIPTION

Figure 1:
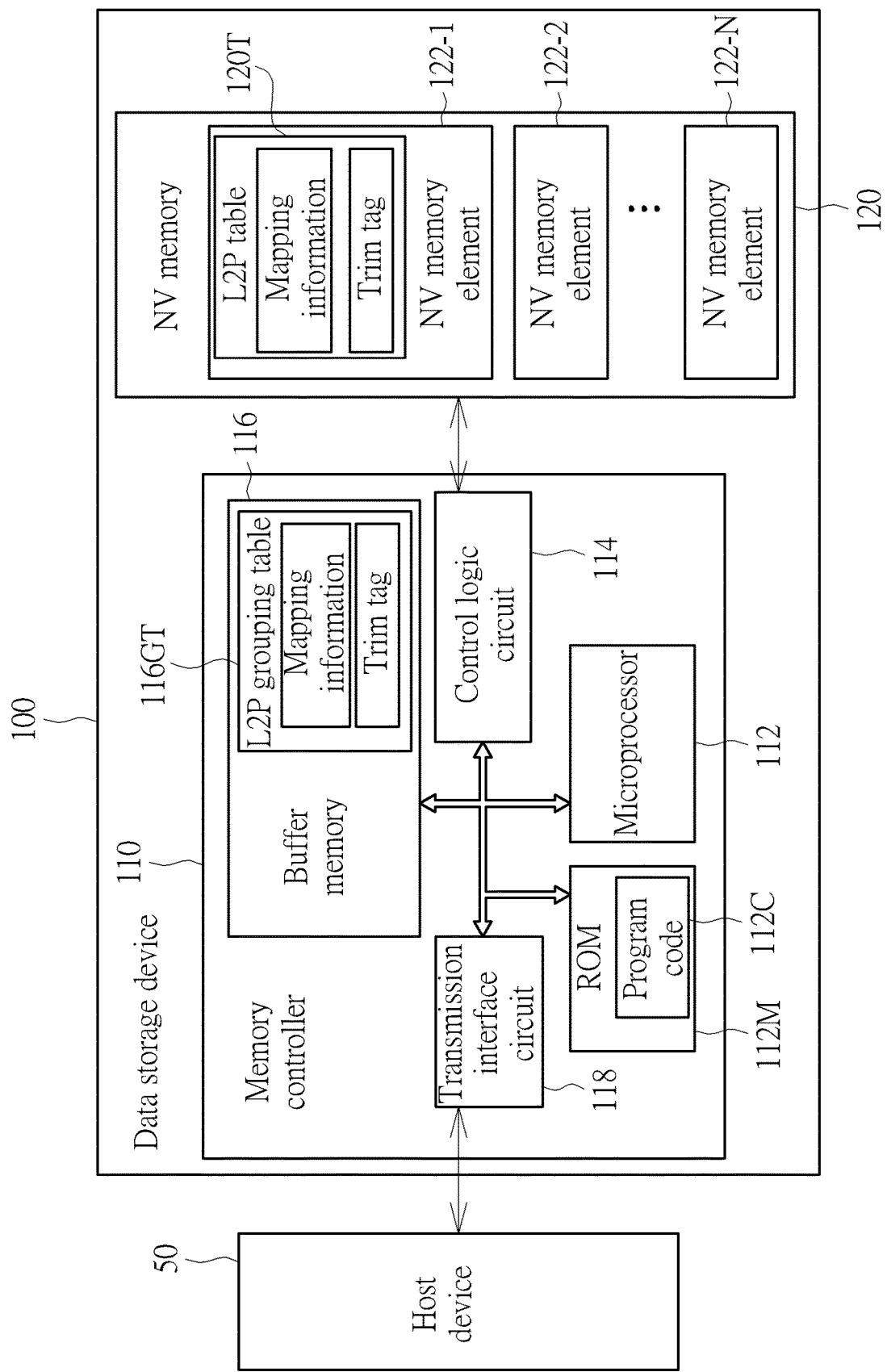
FIG. 1 is a diagram illustrating a data storage device and a host device according to an embodiment of the present invention.

Refer to FIG. 1, which is a diagram illustrating a data storage device 100 and a host device 50 according to a first embodiment of the present invention. The data storage device 100 may be a Solid State Drive (SSD). In addition, examples of the host device 50 may include, but are not limited to: a multifunctional mobile phone, a tablet, and a personal computer such as a desktop computer or a laptop computer. According to this embodiment, the data storage device 100 may comprise a controller such as a memory controller 110, and may further comprise a non-volatile (NV) memory 120, where the controller is configured to access the NV memory 120, and the NV memory 120 is configured to store information.

The NV memory 120 may comprise a plurality of NV memory elements 122-1, 122-2, ... and 122-N, where N may represent a positive integer greater than one. The NV memory 120 may be a Flash memory, and the NV memory elements 122-1, 122-2, ... and 122-N may be a plurality of Flash memory chips or a plurality of Flash memory dies, but the present invention is not limited thereto. Additionally, the data storage device 100 may further comprise a volatile memory element to cache data, wherein the volatile memory element is preferably a Dynamic Random Access Memory (DRAM). The volatile memory element may provide proper data temporary storage space, or only provide a small amount of data temporary storage space. The following description will be illustrated based on the architecture of the data storage device 100 that is not equipped with the volatile memory, but the present invention is not limited thereto.

The memory controller 110 may comprise a processing circuit such as a microprocessor 112, a storage device such as a Read Only Memory (ROM) 112M, a control logic circuit 114, a buffer memory 116, and a transmission interface circuit 118, where these elements may couple to one another through a bus. The buffer memory 116 is implemented by a Random Access Memory (RAM), and is preferably a Static RAM (SRAM). The memory controller 110 may utilize the buffer memory 116 as a first external cache, and utilize the volatile memory as a second external cache. A data storage amount of the volatile memory is preferably greater than that of a data storage amount of the buffer memory 116, and data cached by the volatile memory is preferably from the buffer memory 116.

The ROM 112M of this embodiment is configured to store a program code 112C, and the microprocessor 112 is configured to execute the program code 112C to control access of the NV memory 120. It should be noted that the program code 112C may also be stored in the buffer memory 116 or any type of memory. Additionally, the control logic circuit 114 may comprise an error correction code (ECC) circuit (not shown), in order to protect data and/or perform error correction, and the transmission interface circuit 118 may conform to a specific communications specification (such as the Serial Advanced Technology Attachment (SATA) specification, the Peripheral Component Interconnect Express (PCIE) specification or the NV Memory Express (NVME) specification) and may perform communications according to the specific communications specification.

In this embodiment, the host device 50 may indirectly access the NV memory 120 within the data storage device 100 by transmitting a plurality of host commands and corresponding logical addresses (e.g. Logical Block Address, LBA) to the memory controller 110. The memory controller 110 receives the plurality of host commands and the corresponding logical addresses, and respectively translates the plurality of host commands into memory operating commands (referred to as operating commands for brevity), and further controls the NV memory 120 to read and write/program page(s) of specific physical address(es) within the NV memory 120 according to the operating commands. Mapping relationships between logical addresses and physical addresses may be recorded in a mapping table such as a logical-to-physical (L2P) address mapping table (referred to as an L2P table for brevity) 120T. For example, the memory controller 110 may record mapping information indicating these mapping relationships in the L2P table 120T, and may record other information in the L2P table 120T when needed. In some embodiments, the aforementioned other information may comprise a Trim tag.

For better reading and managing of the L2P table 120T, it is preferable to divide the L2P table into a plurality of L2P grouping tables, and each L2P grouping table within the plurality of L2P grouping tables may be preferably stored into a data page or a super page. FIG. 2 illustrates an L2P table 200 according to an embodiment of the present invention. The L2P table 200 may be an example of the L2P table 120T. The L2P table 200 may be divided into 1024 L2P grouping tables (such as L2P grouping table #0, . . . and L2P grouping table #1023), and each L2P grouping table within these L2P grouping tables may record 1024 mapping relationships between logical addresses (e.g. logical block addresses (LBAs), etc.) and physical addresses (e.g. physical block addresses (PBAs), etc.), wherein each of the physical addresses may be composed of a channel number, a logical unit number (LUN), a plane number, a block number, a page number and an offset. In the following description, the physical addresses will be briefly represented by block numbers such as BLK #0, BLK #1, BLK #2, etc. and page numbers such as Page #0, Page #1, Page #2, etc., where the block numbers BLK #0, BLK #1, BLK #2, etc. may respectively represent a block #0, a block #1, a block #2, etc., and the page numbers Page #0, Page #1, Page #2, etc. may respectively represent a page #0, a page #1, a page #2, etc., but the present invention is not limited thereto. For example, the L2P grouping table #0 may comprise fields respectively corresponding to the LBAs LBA #0, LBA #1, LBA #2, . . . , LBA #100, LBA #101, LBA #102, . . . , LBA #1022 and LBA #1023, for storing physical addresses. In another example, the L2P grouping table #1023 may comprise fields respectively corresponding to LBAs LBA #1047553, LBA #1047554, LBA #1047555, . . . , LBA #1048000, LBA #1048001, LBA #1048002, LBA #1048570, LBA #1048571, for storing physical addresses. Additionally, an initial value of each field within 1024 fields of each L2P grouping table within these L2P grouping tables may be a default value or an invalid value, such as 0xFFFF-FFFF (i.e. 0xFFFFFFFF, where "0x" indicating hexadecimal numbers are omitted in FIG. 2 and subsequent figures for brevity).

During operations of the data storage device 100, the memory controller 110 may read the L2P table 120T (e.g. the plurality of L2P grouping tables) stored by the NV memory 120, and more particularly, may read a set of L2P grouping tables of the L2P table 120T (such as a portion of L2P grouping tables or all L2P grouping tables within the plurality of L2P grouping tables) and temporarily store the set of L2P grouping tables into a memory such as the buffer memory 116, in order to execute operations related to data management. An L2P grouping table 116GT shown in FIG. 1 may be an example of the set of L2P grouping tables. When there is user data that needs to be added, trimmed or updated in the data storage device 100, the memory controller 110 may update the L2P grouping table 116GT and/or the L2P table 120T according to the latest mapping relationship of the user data.

Since the buffer memory 160 typically has limited data storage space only (e.g. capable of temporarily storing 8 L2P grouping tables), the memory controller 110 may swap the L2P grouping table 116GT stored by the buffer memory 116; for example, the memory controller 110 reads a new L2P grouping table from the NV memory 120, and replaces an old L2P grouping table stored by the buffer memory 116 with this new L2P grouping table. In addition, the memory controller preferably establishes a grouping location table to record the physical location of each L2P grouping table within the plurality of L2P grouping tables in the NV memory 120. In addition, the memory controller 110 preferably establishes a grouping temporary storage table to label or record the physical address of each L2P grouping table within the set of L2P grouping tables in the buffer memory 116. The grouping location table and the grouping temporary storage table may be integrated into a grouping management table to simplify table management.

A size of one L2P grouping table is preferably equal to a size of one page of the NV memory element 122-$n$ (wherein $n$ is a positive integer within the interval [1, N]), e.g. 16 kilobytes (KB). In another example, the memory controller 110 may regard (more particularly, emulate and/or combine) pages of four different blocks as one super page, so the size of one L2P grouping table is four times the original size, e.g. 64 KB. In addition, the memory controller 110 preferably programs the plurality of L2P grouping tables into the NV memory 120 in a fast programming mode, wherein the fast programming mode may be the SLC programming mode, and a default programming mode may be the TLC programming mode or the QLC programming mode. These four blocks may be positioned in different channels or controlled by different chip enable (CE) signals.

During the memory controller 110 executing a garbage collection procedure, valid page data such as data of valid page(s) (or valid data) within a source block may be copied to a destination block. For example, when the destination block is closed or the memory controller 110 does not need to write valid page data into the destination block any more, the memory controller 110 generates a physical-to-logical (P2L) address mapping table (referred to as a P2L table for brevity) and stores the P2L table into the destination block, then further updates the L2P grouping table 116GT according to the P2L table, and afterwards, further updates the L2P table 120T according to the L2P grouping table 116GT. In the garbage collection procedure, the number of source blocks may be greater than one, and these source blocks are preferably data blocks having less or the least valid page data, or data blocks having colder (e.g. having the longest time since the latest programming thereof) valid page data. Additionally, when the L2P grouping table 116GT or the L2P table 120T have been updated, any source block that is involved in the garbage collection procedure (e.g. the source block or any of these source blocks) may be re-defined as an idle block for reuse. The destination block may be selected from an idle block pool or multiple queued idle blocks. These idle blocks are preferably idle blocks having the least erase count within the idle block pool.

Figure 3:
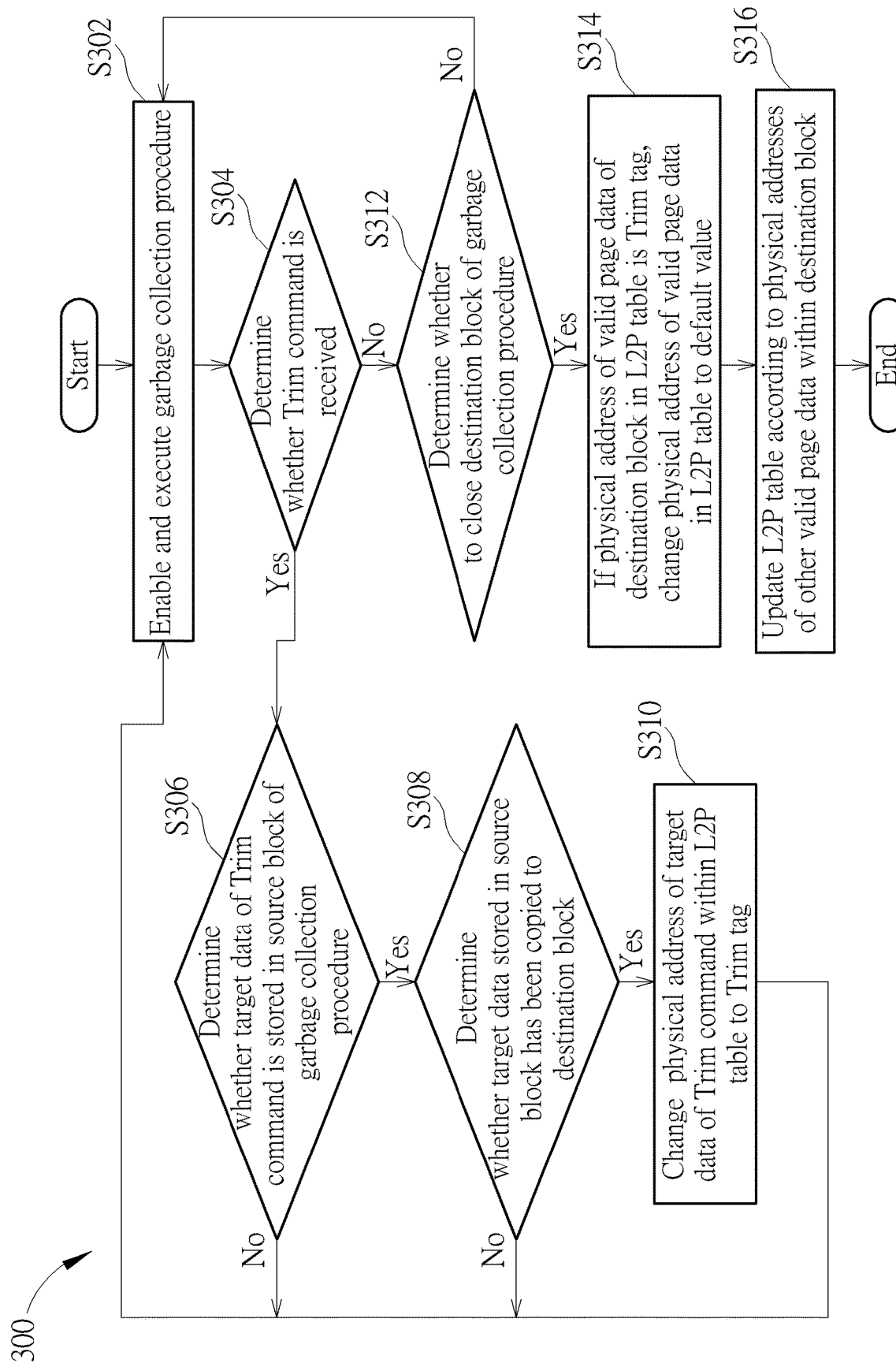
FIG. 3 is a working flow of a high efficiency garbage collection method according to an embodiment of the present invention.

FIG. 3 is a working flow 300 of a high efficiency garbage collection method according to an embodiment of the present invention. For example, under control of the processing circuit such as the microprocessor 112, the controller such as the memory controller 110 may perform operations of the working flow 300. Some steps within the working flow 300 may comprise determination operations, and according to respective determination results of these determination operations, the memory controller 110 may execute operations of subsequent steps within the working flow 300, such as the subsequent steps corresponding to these determination results, in order to achieve optimal performance of the data storage device.

In Step S302, the memory controller 110 enables and executes the garbage collection procedure, wherein after the garbage collection procedure is enabled, the garbage collection procedure may be executed in the foreground or the background. In addition, the garbage collection procedure may be enabled directly by the memory controller 110 or by a request of the host device 50. Additionally, the garbage collection procedure may be executed, segmentally or entirely. When the garbage collection procedure is segmentally executed, the memory controller 110 segmentally copies the valid page data (or the valid data) of the source block to the destination block, and executes the host commands between segmental operations. The source block is data block of the block #1 for example, and stores 20 sets of valid page data; the destination block is idle block of the block #12 for example, and may store 512 sets of page data.

In Step 304, the memory controller 110 determines whether a Trim command from the host device is received; if yes, Step S306 is entered; if no, Step S302 is entered in response to a determination result of Step S312, to continue executing the garbage collection procedure. A starting logical address of the Trim command is the LBA LBA #100 for example, and the number is 2 for example, where it can be known from the above information that there are two sets of target data of the Trim command and their logical addresses are LBAs LBA #100 and LBA #101. It can be known from the L2P grouping table #0 that, regarding the two sets of target data of the Trim command, a physical address of a first set of target data is {BLK #1, Page #0}, which represents the page #0 of the block #1, and a physical address of a second set of target data is {BLK #2, Page #0}, which represents the page #0 of the block #2, where the rest may be induced by analogy.

In Step S306, the memory controller 110 determines whether the target data of the Trim command is stored in the source block of the garbage collection procedure; if yes, Step S308 is entered; if no, Step S302 is entered, to continue executing the garbage collection procedure. It can be known from the above description that the first set of target data of the Trim command is stored in the source block, and the second set of target data is not stored in the source block.

In Step S308, the memory controller 110 determines whether the target data stored in the source block has been copied to the destination block; if yes, Step S310 is entered; if no, Step S302 is entered to continue executing the garbage collection procedure.

In Step S310, the memory controller 110 changes the physical address of the target data of the Trim command within the L2P table 200 to a Trim tag, and afterwards, Step S302 is entered to continue executing the garbage collection procedure, where this Trim tag may indicate that this target data has been invalidated. Assuming that the first set of target data of the Trim command has been copied from the source block to the destination block, the memory controller 110 changes the physical address mapped by the LBA LBA #100 within the L2P table 200 (more specifically, the L2P grouping table #0) to the Trim tag, e.g. 0xFFFF-FFFE (i.e. 0xFFFFFFFE) as shown in FIG. 4. The Trim tag may represent a predetermined value (e.g. 0xFFFF-FFFE) that is different from the default value, and each value of the default value and the predetermined value represents that no mapping relationship between any physical address and any logical address exists. Since the second set of target data is not stored in the source block, the memory controller 110 does not change the physical address mapped by the LBA LBA #101 within the L2P table 200.

In Step S312, the memory controller 110 determines whether to close the destination block of the garbage collection procedure; if yes, Step S314 is entered; if no, e.g. the destination block still has space for having the valid page data (or valid data) written thereto, Step S302 is entered to continue executing the garbage collection procedure.

In Step S314, if the physical address of the valid page data of the destination block in the L2P table 200 is the Trim tag, the memory controller 110 changes the physical address of the valid page data in the L2P table 200 to the default value. According to this embodiment, the memory controller 110 may check whether the physical address of the valid page data of the destination block in the L2P table 200 is the Trim tag, to determine whether to change the aforementioned physical address of the valid page data in the L2P table 200 to the default value. For example, at the beginning of the memory controller 110 establishing the L2P table 200, an initial value of each field within multiple fields of the L2P table 200 is equal to the default value.

In Step S316, the memory controller 110 updates the L2P table 200 according to physical addresses of other valid page data within the destination block. When closing the destination block, the memory controller 110 generates a P2L table (such as that shown in FIG. 5) according to physical addresses of the destination block and logical addresses of valid data stored in these physical addresses, and updates the L2P table 200 according to the P2L table. When the L2P table 200 is going to be updated according to the P2L table, the memory controller 110 first determines whether a value of the physical address within the L2P table 200 to be updated is the Trim tag; if yes, it means this valid page data has been trimmed (e.g. invalidated) by the Trim command when executing the garbage collection procedure; thus, this valid page data is not valid any more. Under this situation, regarding this valid page data, the memory controller 110 does not update the L2P table 200 according to the physical address of the destination block, and the memory controller 110 changes the Trim tag (e.g. FFFF-FFFE shown in FIG. 4) to the default value or the invalid value (e.g. 0xFFFF-FFFF as shown in FIG. 6). As a result, even if page data has been copied to the destination block, this page data is still invalid page data. If a value of the physical address within the L2P table 200 to be updated is not the Trim tag, it means this page data is valid page data. Under this situation, the memory controller 110 updates the L2P table 200 according to the P2L table, where the L2P table after being updated is as shown in FIG. 6. Finally, the memory controller 110 writes the P2L table into the destination block in order to close the destination block.

It should be noted that, if Step S302 or the garbage collection procedure is not enabled or executed when processing the Trim command, the memory controller 110 may process the Trim tag according to a default procedure, e.g. directly change the physical addresses of the target data in the L2P table 200 to the default value or the invalid value, or segmentally change these physical addresses of the L2P table 200 to the default value or the invalid value. If Step S302 or the garbage collection procedure has been enabled or executed but the determination result of Step S308 is "no" (i.e. the target data of the source block has not been copied to the destination block) when processing the Trim command, the memory controller 110 may process the Trim command according to the default procedure, e.g. directly change these physical addresses of the target data in the L2P table 200 to the default value or the invalid value, where since these physical addresses corresponding to the target data have been changed to the default value, the memory controller 110 will not copy the target data of the source block to the destination block afterwards.

It can be known from FIG. 5 that, although the LBA LBA #100 has been invalid page data, the P2L table still has the record. At this moment, if the host device 50 updates user data of the LBA LBA #100 and a sudden power off event occurs afterwards, even though the updated LBA LBA #100 has been recorded in the L2P table, the memory controller 110 might update the L2P table according to the P2L table of the destination block when enabling a sudden power off recovery (SPOR) procedure, thereby causing a data management error. Thus, Step S314 may further comprise: change logical addresses of the target data of the Trim command within the P2L table to the default value or the invalid value, e.g. 0xFFFF-FFFF as shown in FIG. 7. As a result, even if the sudden power off event occurs, it will not cause a data management error.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A high efficiency garbage collection method, the high efficiency garbage collection method being applicable to a data storage device, the data storage device comprising a non-volatile (NV) memory, the NV memory comprising at least one NV memory element, the high efficiency garbage collection method comprising:
   starting and executing a garbage collection procedure;
   determining whether a Trim command from a host device is received;
   in response to the Trim command being received, determining whether target data of the Trim command is stored in a source block of the garbage collection procedure, wherein:
      the step of determining whether the Trim command from the host device is received is executed multiple times, in order to respectively generate a first determination result and a second determination result, wherein the first determination result and the second determination result respectively indicate the Trim command being received and the Trim command being not received; and
      the step of determining whether the target data of the Trim command is stored in the source block of the garbage collection procedure is performed in response to the first determination result;
   in response to the target data being stored in the source block, determining whether the target data stored in the source block has been copied to a destination block of the garbage collection procedure;
   in response to the target data stored in the source block having been copied to the destination block, changing at least one physical address of the target data of the Trim command to a Trim tag in a logical-to-physical (L2P) address mapping table, wherein the Trim tag indicates invalidation of the target data;
   in response to the second determination result, determining whether to close the destination block of the garbage collection procedure; and
   in response to closing the destination block of the garbage collection procedure, checking whether a physical address of valid page data of the destination block in the L2P address mapping table is the Trim tag, in order to determine whether to change said physical address of the valid page data in the L2P address mapping table to a default value.

2. The high efficiency garbage collection method of claim 1, further comprising:
   after changing said at least one physical address of the target data of the Trim command to the Trim tag, continuing executing the garbage collection procedure.

3. The high efficiency garbage collection method of claim 1, further comprising:
   in response to said physical address of the valid page data of the destination block in the L2P address mapping table being the Trim tag, changing said physical address of the valid page data in the L2P address mapping table to the default value.

4. The high efficiency garbage collection method of claim 1, wherein at the beginning of establishing the L2P address mapping table, an initial value of each field within multiple fields of the L2P address mapping table is equal to the default value.

5. The high efficiency garbage collection method of claim 1, wherein the step of determining whether the target data of the Trim command is stored in the source block of the garbage collection procedure is executed multiple times, in order to respectively generate a third determination result and a fourth determination result, wherein the third determination result and the fourth determination result respectively indicate the target data being stored in the source block and the target data being not stored in the source block; the step of determining whether the target data stored in the source block has been copied to the destination block is performed in response to the third determination result; and the method further comprises:
   in response to the fourth determination result, continuing executing the garbage collection procedure.

6. The high efficiency garbage collection method of claim 1, wherein the step of determining whether the target data stored in the source block has been copied to the destination block is executed multiple times, in order to respectively generate a fifth determination result and a sixth determination result, wherein the fifth determination result and the sixth determination result respectively indicate the target data stored in the source block having been copied to the destination block and the target data stored in the source block having not been copied to the destination block; the step of changing said at least one physical address of the target data of the Trim command in the L2P address mapping table to the Trim tag is performed in response to the fifth determination result; and the method further comprises:
   in response to the sixth determination result, continuing executing the garbage collection procedure.

7. The high efficiency garbage collection method of claim 1, wherein the step of determining whether to close the destination block of the garbage collection procedure is executed multiple times, in order to respectively generate a fifth determination result and a sixth determination result, wherein the fifth determination result and the sixth determination result respectively indicate closing the destination block of the garbage collection procedure and not closing the destination block of the garbage collection procedure; the step of checking whether said physical address of the valid page data of the destination block in the L2P address mapping table is the Trim tag in order to determine whether to change the physical address of the valid page data in the L2P address mapping table to the default value is performed in response to the fifth determination result; and the method further comprises:
   in response to the sixth determination result, continuing executing the garbage collection procedure.

8. The high efficiency garbage collection method of claim 1, wherein at the beginning of establishing the L2P address mapping table, an initial value of each field within multiple fields of the L2P address mapping table is equal to the default value; and the Trim tag represents a predetermined value different from the default value.

9. The high efficiency garbage collection method of claim 8, wherein each value of the default value and the predetermined value represents that no mapping relationship between any physical address and any logical address exists.

10. A data storage device, comprising:
a non-volatile (NV) memory, configured to store information, wherein the NV memory comprises at least one NV memory element; and
a controller, coupled to the NV memory, configured to control operations of the data storage device, wherein the controller comprises:
a processing circuit, configured to control the controller according to a plurality of host commands from a host device, to allow the host device to access the NV memory through the controller, wherein:
the controller starts and executes a garbage collection procedure;
the controller determines whether a Trim command from the host device is received;
in response to the Trim command being received, the controller determines whether target data of the Trim command is stored in a source block of the garbage collection procedure, wherein:
the operation of determining whether the Trim command from the host device is received is executed multiple times, in order to respectively generate a first determination result and a second determination result, wherein the first determination result and the second determination result respectively indicate the Trim command being received and the Trim command being not received; and
the operation of determining whether the target data of the Trim command is stored in the source block of the garbage collection procedure is performed in response to the first determination result;
in response to the target data being stored in the source block, the controller determines whether the target data stored in the source block has been copied to a destination block of the garbage collection procedure;
in response to the target data stored in the source block having been copied to the destination block, the controller changes at least one physical address of the target data of the Trim command to a Trim tag in a logical-to-physical (L2P) address mapping table, wherein the Trim tag indicates invalidation of the target data;
in response to the second determination result, the controller determines whether to close the destination block of the garbage collection procedure; and
in response to closing the destination block of the garbage collection procedure, the controller checks whether a physical address of valid page data of the destination block in the L2P address mapping table is the Trim tag, in order to determine whether to change said physical address of the valid page data in the L2P address mapping table to a default value.

11. The data storage device of claim 10, wherein after changing said at least one physical address of the target data of the Trim command to the Trim tag, the controller continues executing the garbage collection procedure.

12. The data storage device of claim 10, wherein the operation of determining whether the target data of the Trim command is stored in the source block of the garbage collection procedure is executed multiple times, in order to respectively generate a third determination result and a fourth determination result, wherein the third determination result and the fourth determination result respectively indicate the target data being stored in the source block and the target data being not stored in the source block; the operation of determining whether the target data stored in the source block has been copied to the destination block is performed in response to the third determination result; and in response to the fourth determination result, the controller continues executing the garbage collection procedure.

13. The data storage device of claim 10, wherein the operation of determining whether the target data stored in the source block has been copied to the destination block is executed multiple times, in order to respectively generate a fifth determination result and a sixth determination result, wherein the fifth determination result and the sixth determination result respectively indicate the target data stored in the source block having been copied to the destination block and the target data stored in the source block having not been copied to the destination block; the operation of changing said at least one physical address of the target data of the Trim command in the L2P address mapping table to the Trim tag is performed in response to the fifth determination result; and in response to the sixth determination result, the controller continues executing the garbage collection procedure.

14. A controller of a data storage device, the data storage device comprising the controller and a non-volatile (NV) memory, the NV memory comprising at least one NV memory element, the controller comprising:
a processing circuit, configured to control the controller according to a plurality of host commands from a host device, to allow the host device to access the NV memory through the controller, wherein:
the controller starts and executes a garbage collection procedure;
the controller determines whether a Trim command from the host device is received;
in response to the Trim command being received, the controller determines whether target data of the Trim command is stored in a source block of the garbage collection procedure, wherein:
the operation of determining whether the Trim command from the host device is received is executed multiple times, in order to respectively generate a first determination result and a second determination result, wherein the first determination result and the second determination result respectively indicate the Trim command being received and the Trim command being not received; and
the operation of determining whether the target data of the Trim command is stored in the source block of the garbage collection procedure is performed in response to the first determination result;
in response to the target data being stored in the source block, the controller determines whether the target data stored in the source block has been copied to a destination block of the garbage collection procedure;
in response to the target data stored in the source block having been copied to the destination block, the controller changes at least one physical address of the target data of the Trim command to a Trim tag in a logical-to-physical (L2P) address mapping table, wherein the Trim tag indicates invalidation of the target data;
in response to the second determination result, the controller determines whether to close the destination block of the garbage collection procedure; and in response to closing the destination block of the garbage collection procedure, the controller checks whether a physical address of valid page data of the destination block in the L2P address mapping table is the Trim tag, in order to determine whether to change said physical address of the valid page data in the L2P address mapping table to a default value.

15. The controller of claim 14, wherein after changing said at least one physical address of the target data of the Trim command to the Trim tag, the controller continues executing the garbage collection procedure.

16. The controller of claim 14, wherein the operation of determining whether the target data of the Trim command is stored in the source block of the garbage collection procedure is executed multiple times, in order to respectively generate a third determination result and a fourth determination result, wherein the third determination result and the fourth determination result respectively indicate the target data being stored in the source block and the target data being not stored in the source block; the operation of determining whether the target data stored in the source block has been copied to the destination block is performed in response to the third determination result; and in response to the fourth determination result, the controller continues executing the garbage collection procedure.

17. The controller of claim 14, wherein the operation of determining whether the target data stored in the source block has been copied to the destination block is executed multiple times, in order to respectively generate a fifth determination result and a sixth determination result, wherein the fifth determination result and the sixth determination result respectively indicate the target data stored in the source block having been copied to the destination block and the target data stored in the source block having not been copied to the destination block; the operation of changing said at least one physical address of the target data of the Trim command in the L2P address mapping table to the Trim tag is performed in response to the fifth determination result; and in response to the sixth determination result, the controller continues executing the garbage collection procedure.

* * * * *